US012628043B2

(12) United States Patent
Kim et al.

(10) Patent No.: US 12,628,043 B2
(45) Date of Patent: May 12, 2026

(54) METHOD AND APPARATUS FOR SCHEDULING PACKET TRANSMISSION BASED ON ACCESS NETWORK PACKET DELAY BUDGET

(71) Applicant: Samsung Electronics Co., Ltd., Suwon-si (KR)

(72) Inventors: Sunhyun Kim, Suwon-si (KR); Dongmyung Kim, Suwon-si (KR); Younggyoun Moon, Suwon-si (KR); Jungsoo Jung, Suwon-si (KR); Sunwoo Cho, Suwon-si (KR); Jiyoung Cha, Suwon-si (KR); Jinho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 786 days.

(21) Appl. No.: 17/861,799

(22) Filed: Jul. 11, 2022

(65) Prior Publication Data

US 2023/0370896 A1     Nov. 16, 2023

(30) Foreign Application Priority Data

May 10, 2022     (KR) ........................ 10-2022-0057381

(51) Int. Cl.
H04W 28/08     (2023.01)
H04L 47/24     (2022.01)
(Continued)

(52) U.S. Cl.
CPC ......... H04W 28/0983 (2020.05); H04L 47/24 (2013.01); H04L 47/2483 (2013.01);
(Continued)

(58) Field of Classification Search
None
See application file for complete search history.

(56) References Cited

U.S. PATENT DOCUMENTS

2020/0359244 A1     11/2020     Yao et al.
2021/0258820 A1     8/2021     Dao
(Continued)

FOREIGN PATENT DOCUMENTS

CN     113747512 A     12/2021
EP     3 742 795 A1     11/2020
(Continued)

OTHER PUBLICATIONS

Wikipedia on GPRS Tunneling Protocol (Year: 2022).*
(Continued)

*Primary Examiner* — Peter P Chau
*Assistant Examiner* — Christopher R Davis
(74) *Attorney, Agent, or Firm* — Jefferson IP Law, LLP

(57) ABSTRACT

The disclosure relates to a 5G or 6G communication system for supporting a higher data transmission rate. A method performed by a base station in a communication system is provided. The method includes receiving a packet including metadata from a user plane function (UPF), identifying a packet delay budget (PDB) for a quality of service (QoS) flow of the packet, identifying a delay time of the packet based on the metadata, determining an access network (AN) PDB based on the PDB and the delay time, and performing scheduling for transmission of the packet to a terminal based on the AN PDB.

10 Claims, 14 Drawing Sheets

(51) Int. Cl.

| | |
|---|---|
| *H04L 47/2483* | (2022.01) |
| *H04L 47/32* | (2022.01) |
| *H04W 28/02* | (2009.01) |
| *H04W 28/24* | (2009.01) |

(52) U.S. Cl.
CPC ............. *H04L 47/32* (2013.01); *H04W 28/02* (2013.01); *H04W 28/0236* (2013.01); *H04W 28/0268* (2013.01); *H04W 28/24* (2013.01)

(56) References Cited

U.S. PATENT DOCUMENTS

| | | | | |
|---|---|---|---|---|
| 2022/0078857 | A1 | 3/2022 | Kim | |
| 2022/0303824 | A1* | 9/2022 | Li | H04W 40/36 |
| 2022/0386163 | A1* | 12/2022 | Hande | H04W 28/18 |
| 2023/0092723 | A1* | 3/2023 | Qu | H04W 56/001 |
| | | | | 370/235 |
| 2023/0388036 | A1* | 11/2023 | Li | H04W 56/001 |

FOREIGN PATENT DOCUMENTS

| | | | |
|---|---|---|---|
| JP | 2020-107968 | A | 7/2020 |
| KR | 10-2018-0107000 | A | 10/2018 |
| KR | 2054998 | B1 | 12/2019 |
| KR | 2021-0056889 | A | 5/2021 |
| KR | 2021-0060187 | A | 5/2021 |
| WO | 2020/141859 | A1 | 7/2020 |

OTHER PUBLICATIONS

3GPP TS 29.281 version 17.2.0 Release 17Universal Mobile Telecommunications System (UMTS); LTE; 5G; General Packet Radio System (GPRS) (Year: 2022).*

International Search Report dated Dec. 9, 2022, issued in International Application No. PCT/KR2022/010069.

Samsung, QoS parameter—Packet Delay Budget, 3GPP Draft; S2-163704, SA WG2 Meeting #116, Vienna, Austria, Jul. 10, 2016, XP051118286.

Extended European Search Report dated May 13, 2025, issued in European Patent Application No. 22941793.6.

* cited by examiner

METHOD AND APPARATUS FOR SCHEDULING PACKET TRANSMISSION BASED ON ACCESS NETWORK PACKET DELAY BUDGET

CROSS-REFERENCE TO RELATED APPLICATION(S)

This application is based on and claims priority under 35 U.S.C. § 119(a) of a Korean patent application number 10-2022-0057381, filed on May 10, 2022, in the Korean Intellectual Property Office, the disclosure of which is incorporated by reference herein in its entirety.

BACKGROUND

1. Field

The disclosure relates to a communication system. More particularly, the disclosure relates to a method and an apparatus for improving the quality of service (QoS).

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broad-bands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

An access network packet delay budget (AN PDB) defines the upper limit regarding the packet delay time between a UE and a base station, and the base station may perform uplink or downlink scheduling regarding the UE based on the AN PDB. In this case, the base station may determine the AN PDB based on a CN PDB defined as a static value and a PDB determined according to a 5G QoS identifier (5GI). If the CN PDB value is defined as a static value, however, the packet delay time between the base station and a user plane function (UPF) may exceed the CN PDB (for example, tail latency), thereby degrading the end-to-end quality of service (QoS). Therefore, the base station needs to determine an accurate AN PDB by determining a core network packet delay (CN PD).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for improving the end-to-end (E2E) quality of service (QoS) by performing scheduling regarding a UE so as to reflect a packet delay in a wired network.

Additional aspects will be set forth in part in the description which follows and, in part, will be apparent from the description, or may be learned by practice of the presented embodiments.

In accordance with an aspect of the disclosure, a method performed by a base station in a communication system is provided. The method includes receiving a packet including metadata from a user plane function (UPF), identifying a packet delay budget (PDB) for a quality of service (QoS) flow of the packet, identifying a delay time of the packet based on the metadata, determining an access network (AN) PDB based on the PDB and the delay time, and performing scheduling for transmission of the packet to a terminal based on the AN PDB.

In accordance with another aspect of the disclosure, a method performed by a UPF in a communication system is provided. The method includes receiving a packet from a data network (DN), identifying whether the packet includes information related to a DN packet delay (PD), inserting metadata into the packet, and transmitting the packet with the inserted metadata to a base station.

In accordance with another aspect of the disclosure, a base station in a communication system is provided. The base station includes a transceiver and at least one processor coupled with the transceiver. The at least one processor is configured to receive a packet including metadata from a UPF, identify a PDB for a QoS flow of the packet, identify a delay time of the packet based on the metadata, determine an AN PDB based on the PDB and the delay time, and perform scheduling for transmission of the packet to a terminal based on the AN PDB.

In accordance with another aspect of the disclosure, a UPF in a communication system is provided. The UPF includes a transceiver and at least one processor coupled with the transceiver. The at least one processor is configured to receive a packet from a data network, identify whether the packet includes information related to a DN PD, insert metadata into the packet, and transmit the packet with the inserted metadata to a base station.

An apparatus and a method according to embodiments of the disclosure may improve the end-to-end (E2E) quality of service (QoS) in a communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates a communication system based on INT according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, in order to determine whether a specific condition is satisfied or fulfilled, the expressions more/greater/larger than or less/smaller than may be used, but this is only a description for expressing an example, and does not exclude a description of equal to or more/greater/larger than or a description of equal to or less/smaller than. The condition described as "equal to or more/greater/larger than" may be replaced with "more/greater/larger than," the condition described as "equal to or less/smaller than" may be replaced with "less/smaller than," and the condition described as "equal to or more/greater/larger than, and less/smaller than" may be replaced with "more/greater/larger than, and equal to or less/smaller than."

In the disclosure, embodiments will be described using terms employed in some communication standards (e.g., long term evolution (LTE) and new radio (NR) defined by 3rd generation partnership project (3GPP)), but they are only for the purpose of illustration. The embodiments of the disclosure may be easily applied to other communication systems through modifications.

Figure 1:
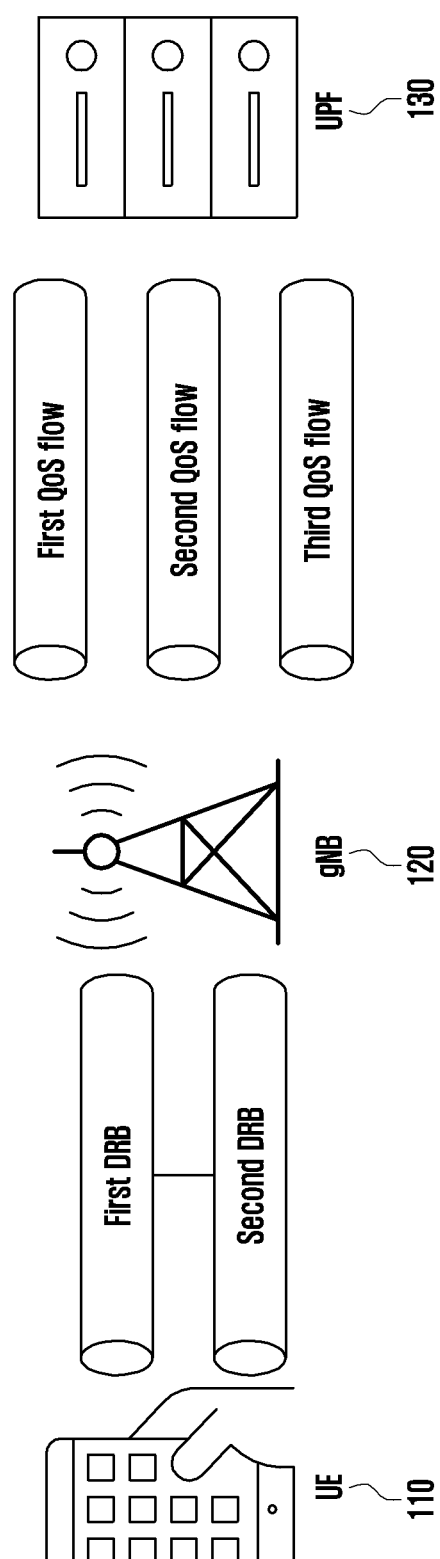
FIG. 1 illustrates a communication system according to an embodiment of the disclosure.

FIG. 1 illustrates a communication system according to an embodiment of the disclosure. FIG. 1 illustrates a terminal 110, a base station 120, a user plane function (UPF) 130, as parts of nodes of a communication system.

The terminal 110 may access a data network (DN) through the base station 120 and the UPF 130. In order for the terminal 110 to transmit or receive data through the UPF 130, a protocol data unit (PDU) session needs to be generated, and one PDU session may include one or more quality of service (QoS) flows. For example, referring to FIG. 1, a PDU session may include a first QoS flow, a second QoS flow, and a third QoS flow. The terminal 110 may be referred to as a user equipment (UE), a mobile station, a subscriber station, a remote terminal, a wireless terminal, and a user device, a customer premise equipment (CPE), an electronic device, or other terms having an equivalent technical meaning thereof.

The base station 120 is a radio access network (RAN) node and is a network infrastructure that provides radio access to a terminal. The base station 120 may perform mapping between a QoS flow and a specific data radio bearer (DRB) based on information (QoS flow identifier (QFI), QoS profile) received from one of control plane network functions (e.g., a session management function (SMF)) of a core network (CN). For example, referring to FIG. 1, a first QoS flow and a second QoS flow may be mapped to a first DRB, and a third QoS flow may be mapped to a second DRB. The base station 120 may be referred to as access point (AP), eNodeB (eNB), 5th generation node (5G node), next generation nodeB (gNB), wireless point, transmission and reception point (TRP), or other terms having equivalent technical meanings thereof.

The UPF 130 is a network function responsible for a user plane in a core network. The UPF 130 may perform a function of transferring an uplink packet, which is received from a base station through a specific PDU session, to a data network corresponding to the corresponding PDU session. In addition, the UPF 130 may perform a function of mapping a downlink packet, which is received from a data network, to a specific QoS flow included in a specific PDU session.

Here, a QoS flow may be associated with a set of QoS characteristics. In this case, the set of QoS characteristics may be defined according to a 5G QoS identifier (5QI), and, for example, may be configured as shown in Table 1 below. However, the following Table 1 is only an example of standardized 5QI, and non-standardized 5QI may be separately defined by a network.

TABLE 1

| 5QI | Resource type | Priority level | PDB | PER | MDBV | Averaging window |
|---|---|---|---|---|---|---|
| 1 | GBR | 20 | 100 ms | $10^{-2}$ | N/A | 2 seconds |
| 2 | GBR | 40 | 150 ms | $10^{-3}$ | | |
| . . . | . . . | . . . | . . . | . . . | . . . | . . . |
| 5 | Non-GBR | 10 | 100 ms | $10^{-6}$ | N/A | N/A |
| 6 | Non-GBR | 60 | 300 ms | $10^{-3}$ | | |
| . . . | . . . | . . . | . . . | . . . | . . . | . . . |
| 82 | Delay-critical GBR | 19 | 10 ms | $10^{-4}$ | 255 bytes | 2 seconds |
| 83 | Delay-critical GBR | 22 | 10 ms | $10^{-5}$ | 1358 bytes | |

QoS characteristics may include a resource type, a priority level, a packet delay budget (PDB), a packet error rate (PER), a maximum data burst volume (MDBV), and averaging window.

The resource type may be one of a guaranteed bit rate (GBR), a non-GBR, and a delay-critical GBR. The GBR may provide a guaranteed flow bit rate (GFBR) to an end user, and may be used for time-sensitive applications (e.g., telephone call, real time gaming (RTG), and vehicle to everything (V2X)). Non-GBR does not provide the GFBR to end users and may be used for applications that are not time-sensitive (e.g., web browsing). The delay-critical GBR is capable of providing a much shorter latency than GBR, in which GBR QoS flows may allow a PDB of 100 ms, whereas a delay-critical GBR may allow a PDB of 10 ms. Here, the GFBR may be defined as the minimum bit transmission rate that may be expected in a QoS flow when measured in the averaging window.

In embodiments according to the disclosure, the resource type may include an object-delay GBR in addition to the above-described GBR, non-GBR, and delay-critical GBR. Since the GBR, non-GBR, and delay-critical GBR operates based on the PDB, there may be a problem that a target packet delay time cannot be stably provided. That is, since the base station 120 schedules a packet to be transferred to the terminal 110 within a range of the PDB, the packet may experience various delays within the range of the PDB. On the other hand, the object-delay GBR may support a packet to experience a specific delay time stably. For example, the object-delay GBR may be configured as shown in Table 2 below.

TABLE 2

| 5QI | Resource type | Priority level | OPD | OPDB | PER | MDBV | Averaging window |
|---|---|---|---|---|---|---|---|
| 123 | Object-delay GBR | 10 | 50 | ±10 | $10^{-1}$ | N/A | 0.5 seconds |

Here, an object delay budget (OPD) may refer to a target delay time with regard to a corresponding packet. In addition, an object packet delay boundary (OPDB) may refer to an allowable error range for the OPD. For example, when 5QI is configured as 123 as shown in Table 2, the corresponding packet may be scheduled to experience a delay between 40 and 60 ms.

However, the above-mentioned Table 2 is only an example, and the object-delay GBR may be variously configured based on the OPD and OPDB in the embodiments according to the disclosure. In addition, the object-delay GBR, OPD, and OPDB are only names, and in embodiments according to the disclosure, corresponding names may be variously referred to according to the purpose.

The priority level may be used to designate a priority between QoS flows, and a low numeric value may correspond to a high priority. PER may be defined as the ratio of higher layer packets that are not successfully transmitted. MDBV may be defined as the maximum amount of data that the base station should support for a specific period of time (e.g., 9 ms).

The PDB may be defined as an upper limit of the packet delay time between the terminal 110 and the UPF 130. More specifically, the PDB may be defined as an upper limit of the packet delay time between the terminal 110 and an N6 termination point of the UPF 130.

The PDB may include an access network (AN) PDB, which is defined as an upper limit of a packet delay time between the terminal 110 and the base station 120, and a CN PDB, which is defined as an upper limit of a packet delay time between the base station 120 and the UPF 130. Here, the CN PDB may be configured to be a static value (e.g., one of 1 ms, 2 ms, 5 ms, 10 ms, and 20 ms) for each 5QI. For example, when the 5QI value is 1, the CN PDB may be configured to be 20 ms. As another example, when the 5QI value is 82, the CN PDB may be configured to be 1 ms.

Accordingly, the AN PDB may be determined based on the 5QI of the QoS flow. That is, since the PDB and the CN PDB are determined according to 5QI, the AN PDB may be determined based on the PDB and the CN PDB. In this case, the AN PDB may be calculated according to Equation 1 below.

$$AN\ PDB = PDB - CN\ PDB \qquad \text{Equation 1}$$

The base station 120 may perform uplink or downlink scheduling for a terminal based on the calculated AN PDB. In this case, the base station 120 may determine a scheduling weight for a specific packet based on the AN PDB. This may be understood as meaning that the scheduling weight for a specific packet increases according to time, and the specific packet is assigned a scheduling weight that increases as time consumed in a transmit buffer approaches the AN PDB. Therefore, the lower the AN PDB, the higher the scheduling weight is assigned, and thus packet transmission can be performed without delay.

As described above, since the PDB and the CN PDB are determined according to a 5QI configured in a QoS flow, the AN PDB may also be static. In this case, a problem in which quality of service (QoS) deteriorates may occur according to a packet delay between the base station 120 and the UPF 130.

For example, according to the 5QI, the PDB may be configured to be 50 ms, the CN PDB may be configured to be 20 ms, and the AN PDB may be configured to be 30 ms.

As a first example, a packet delay (e.g., 10 ms) between the base station 120 and the UPF 130 may be smaller than the CN PDB. In this case, since a packet of QoS flow has arrived earlier than the upper limit of the configured packet delay, the base station 120 may be allowed to preferentially schedule another QoS flow. However, according to a method of deriving the AN PDB based on the CN PDB, since the base station 120 is not capable of knowing the above-described actual packet delay time (e.g., 10 ms), the base station may not preferentially schedule another QoS flow. Accordingly, degradation of the overall QoS flow may occur.

As a second example, a packet delay (e.g., 28 ms) between the base station 120 and the UPF 130 may exceed the CN PDB. Therefore, although the AN PDB is configured to be 30 ms, the actual guaranteed time is only 22 ms and thus preferential scheduling for the packets of the corresponding QoS flow is required. That is, it is required to configure a scheduling weight for the corresponding packet to be higher than a target weight. However, according to a method of deriving the AN PDB based on the CN PDB, since the base station 120 is not capable of knowing the above-described actual packet delay time (e.g., 28 ms), the base station cannot preferentially schedule the corresponding QoS flow. Accordingly, QoS degradation for the corresponding QoS flow may occur. In addition, in a case of a delay-critical GBR and a GBR which are sensitive to a delay time, when the actual packet delay time exceeds the CN PDB, it may be advantageous in terms of overall QoS and radio resources that the base station 120 does not to transmit the corresponding packet to a terminal. However, according to the method of deriving the AN PDB based on the CN PDB, since the base station 120 is not capable of knowing the above-described actual packet delay time (e.g., 28 ms), the corresponding packet is transmitted to the terminal.

Therefore, it is required to measure an actual packet delay time between the base station 120 and the UPF 130 rather than deriving the AN PDB based on the CN PDB as described above. Hereinafter, as a method of measuring a packet delay time between the base station 120 and the UPF 130, an in-band network telemetry (INT) technique will be described.

Figure 2:
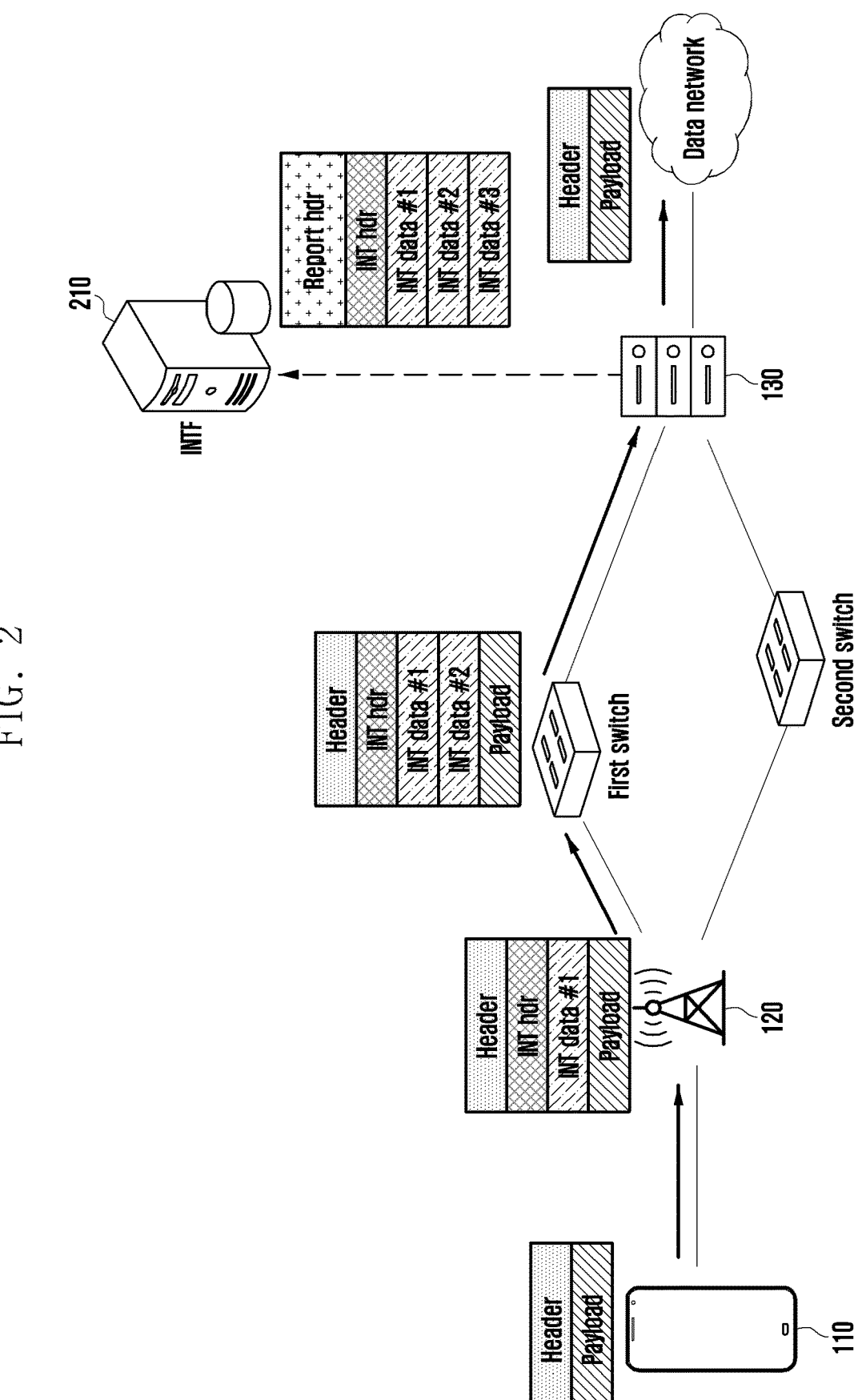
FIG. 2 is a diagram for explaining in-band network telemetry (INT) according to an embodiment of the disclosure.

FIG. 2 illustrates a communication system based on in-band network telemetry (INT) according to an embodiment of the disclosure.

Referring to FIG. 2, a method in which nodes of a communication system generate, store, and transmit metadata based on in-band network telemetry (INT) will be described.

The complexity of the communication system increases as the number of connected devices, the amount of traffic, and the number of supported protocols and services increase. In such a communication system, the existing method has limitations in network monitoring. In order to overcome this limitation, network telemetry has been proposed.

Network telemetry may be divided into an in-band method and an out-of-band method according to a method of acquiring network state information. In the out-of-band method, network state information is obtained through a separate detection packet, whereas in the in-band method, network state information may be obtained by inserting a telemetry packet into a data packet. Here, the in-band method may be referred to as in-band network telemetry (INT).

According to the INT, the network device may obtain network state information in a data plane (or a user plane) without intervention of a control plane. Here, the network state information may be referred to as metadata. Such metadata is transmitted by being inserted into a data packet, and may include a timestamp and buffer-related information (e.g., queue usage, queue congestion status), and the like.

Referring to FIG. 2, the terminal 110 may transmit an uplink packet to the base station 120. In this case, a header may include a source IP address (e.g., an IP address of the terminal) and a destination IP address (e.g., a server IP address of a data network). The base station 120 may insert an INT header and INT data #1 into a received uplink packet. Here, the INT header may indicate the type of INT data #1. For example, the INT header may indicate that the type of INT data #1 is a timestamp. After inserting the INT header and INT data #1, the base station 120 may transmit an uplink packet to the UPF 130. The uplink packet may be transferred to the UPF 130 via a first switch. In this case, after inserting INT data #2, the first switch may transmit the uplink packet to the UPF 130. The UPF 130 may identify the type of INT data based on the header of the received uplink packet and identify INT data #1, INT data #2, and INT data #3, and thus may identify a delay time of the uplink packet during transmission to the UPF 130 from the base station 120. The UPF 130 may transmit pieces of INT data to a device 210 for monitoring a network state. In this case, the device for monitoring the network state may perform an in-band network telemetry function (INTF). The INTF corresponds to a control plane network function, and may perform application and management of the INT. For example, the INTF may perform functions such as telemetry triggering, telemetry instruction setup, telemetry instruction type setup, telemetry report periodicity setup, and telemetry tier setup. Although a case in which uplink transmission is performed has been described in FIG. 2, a case of downlink transmission may be similarly described.

Figure 3:
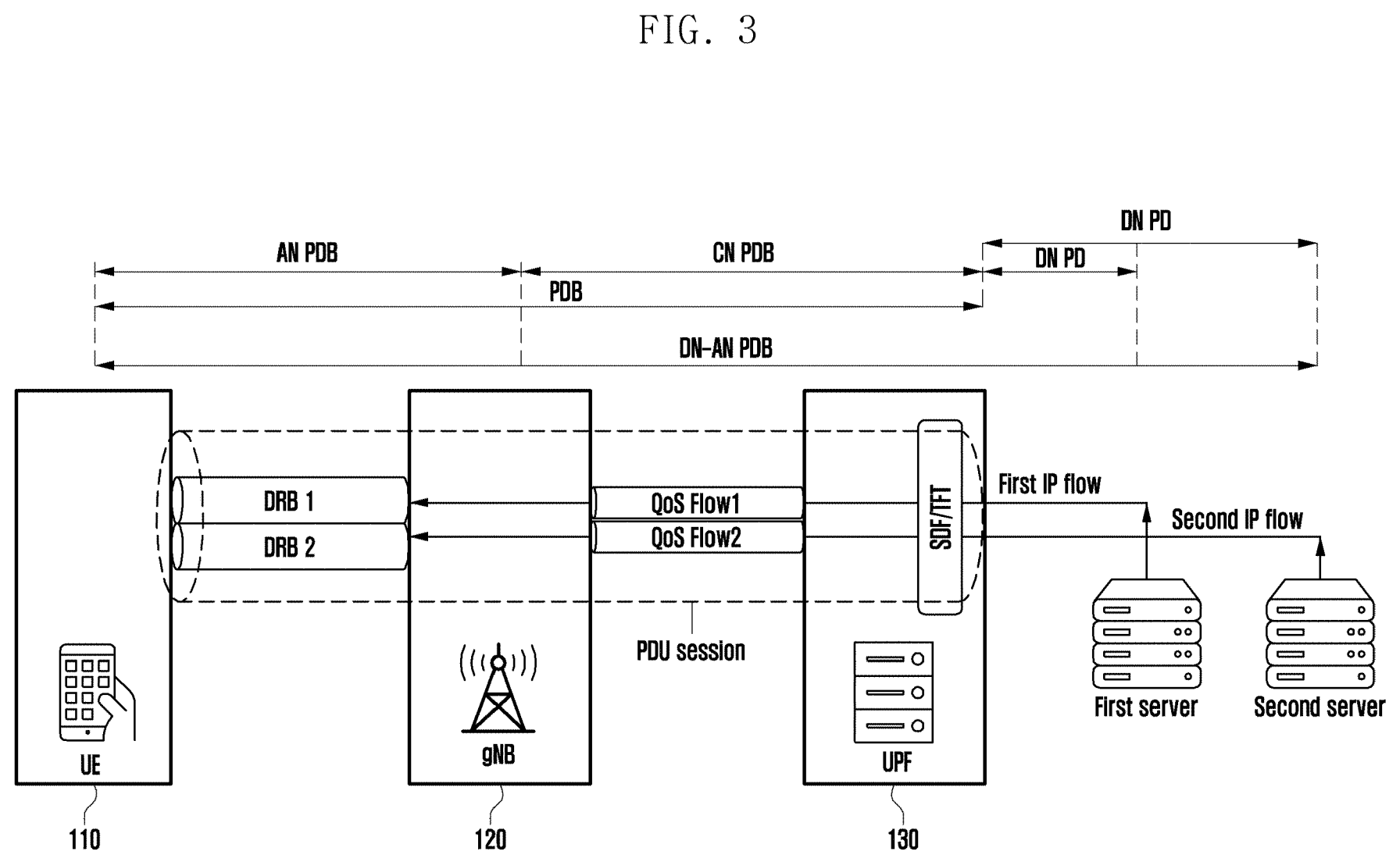

FIG. 3 illustrates a communication system based on in-band network telemetry (INT) according to an embodiment of the disclosure.

Referring to FIG. 3, a case in which a CN PDB is static and a case in which a CN PD is measured are compared and described, and a process in which a base station determines an access network packet delay budget (AN PDB) by further considering a data network packet delay (DN PD) of a data network is described.

Referring to FIG. 3, first packets from a first server may be transferred to the terminal 110 through a first IP flow, and second packets from a second server may be transferred to the terminal 110 through a second IP flow. Here, the first IP flow may be mapped to a first QoS flow, and the second IP flow may be mapped to a second QoS flow. In addition, the first QoS flow may be mapped to a first DRB, and the second QoS flow may be mapped to a second DRB. However, this is only an example, and in embodiments of the disclosure, IP flows, QoS flows, and DRBs may be mapped in various methods.

Hereinafter, as an example, it is assumed that the PDB of the first QoS flow and the second QoS flow is configured to be 50 ms, and the CN PDB is configured to be 20 ms.

A case in which QoS adjustment is performed through the CN PDB will be described as follows. The UPF 130 may receive a first IP flow including first packets from the first server. In addition, the UPF 130 may receive a second IP flow including second packets from the second server. The UPF 130 may map the first IP flow to the first QoS flow and map the second IP flow to the second QoS flow based on a service data flow (SDF) template. The UPF 130 may transmit the first packets to the base station 120 based on the first QoS flow. In addition, the UPF 130 may transmit the second packets to the base station 120 based on the second QoS flow.

Here, the base station 120 may determine the AN PDB of the first packets and the AN PDB of the second packets. Since the PDB of the first QoS flow and the second QoS flow is configured to be 50 ms and the CN PDB is configured to be 20 ms, the base station 120 may determine the AN PDB of the first packets and the AN PDB of the second packets to be 30 ms. The base station 120 may schedule the first packets and the second packets with regard to the terminal 110 based on the determined AN PDB (30 ms). That is, one or more first packets and one or more second packets may be processed with the same QoS.

However, here, a case may occur in which the (actual) core network packet delay (CN PD) of the first packets and the CN PD of the second packets are different. For example, the CN PD of the first packets may be 28 ms, and the CN PD of the second packets may be 12 ms. Even when QoS adjustment is performed based on the CN PDB, the first packets and the second packets are processed with the same QoS, and thus QoS degradation may occur.

A case of adjusting QoS through the CN PD may be described as follows. The UPF 130 may receive a first IP flow including first packets from the first server. In addition, the UPF 130 may receive a second IP flow including second packets from the second server. The UPF 130 may map the first IP flow to a first QoS flow, and may insert metadata into a header of at least one of the first packets. The UPF 130 may map the second IP flow to a second QoS flow, and may insert metadata into a header of at least one of the second packets. The frequency of metadata insertion into packets may be determined by a network function of the control plane. For example, the network function may be an in-band network telemetry function (INTF). Here, the header may be a header of a general packet radio service (GPRS) tunneling protocol-user plane (GTP-U). In addition, the metadata is regarding to a transport network, and may be referred to as telecommunication company telemetry metadata (T-TM). The UPF 130 may transmit the first packets into which metadata is inserted to the base station 120 based on the first QoS flow. In addition, the UPF 130 may transmit the second packets into which the metadata is inserted to the base station 120 based on the second QoS flow.

Here, the base station 120 may determine a first AN PDB for the first packets and a second AN PDB for the second packets. The base station 120 may determine a CN PD of the first packets based on metadata included in at least one of the first packets. In addition, the base station 120 may determine a CN PD of the second packets based on metadata included in at least one of the second packets. Here, the AN PDB may be calculated according to Equation 2 below.

$$AN\ PDB = PDB - CN\ PD \hspace{2em} \text{Equation 2}$$

As in the previous example, when the CN PD of the first packets is 28 ms and the CN PD of the second packets is 12 ms, the first AN PDB may be determined to be 22 ms, and the second AN PDB may be determined to be 38 ms. Accordingly, even when the PDB and the CN PDB are configured identically, the base station 120 may schedule the first packets and the second packets differently according to a delay time of a wired network. As a result, end-to-end QoS can be guaranteed.

In addition to the above description, a delay between the UPF 130 and the data network (DN) may also be reflected in the scheduling of the base station 120 based on the INT. In this case, a header of at least one of the IP packets may include metadata. Here, the header may be a transmission control protocol/user datagram protocol (TCP/UDP) header. Metadata included in the TCP/UDP header is regarding to a data network, and may be referred to as data network-telemetry metadata (DN-TM).

Hereinafter, header processing in case that the DN-TM is included in a header and received will be described.

Figure 4:
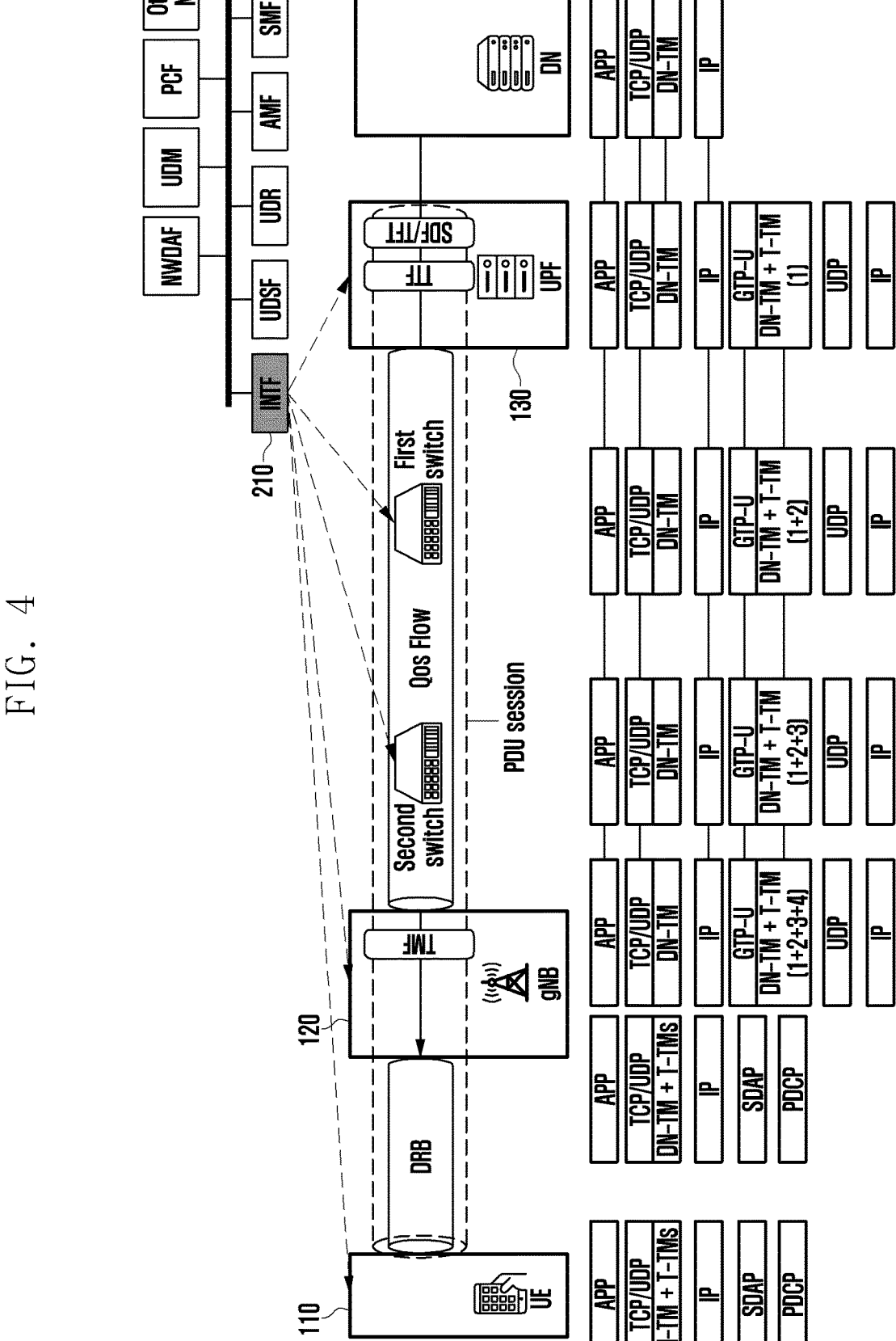
FIG. 4 illustrates a communication system based on INT according to an embodiment of the disclosure.

FIG. 4 illustrates a communication system based on in-band network telemetry (INT) according to an embodiment of the disclosure. FIG. 4 exemplifies a terminal 110, a base station 120, a first switch, a second switch, a UPF 130, and network functions of a control plane, as parts of nodes of the communication system. Here, the switch may be a software defined network (SDN) switch.

Referring to FIG. 4, the UPF 130 may receive a downlink packet from a data network (DN). Here, a TCP/UDP header of the downlink packet may include data network-telemetry metadata (DN-TM). The UPF 130 may perform a telemetry translation function (TTF). The TTF may be a function of copying the DN-TM included in the TCP/UDP header and adding the copied DN-TM to a GPRS tunneling protocol-user plane (GTP-U) header. In addition, the UPF 130 may add telecommunication company telemetry metadata (T-TM) 1, which is telemetry metadata of the UPF 130, to the GTP-U header. The UPF 130 may perform TTF, may add T-TM1 to the GTP-U header, and then may transmit a downlink packet to the base station 120. In this case, it is assumed that the downlink packet is transferred to the base station 120 via the first switch and the second switch.

The first switch and the second switch may each add their own T-TM to the GTP-U header. For example, after adding T-TM2 to the GTP-U header of a downlink packet, the first switch may transmit the downlink packet to the second switch. In addition, after adding T-TM3 to the GTP-U header of the downlink packet, the second switch may transmit the downlink packet to the base station 120.

The base station 120 may receive a downlink packet from the UPF 130 through the first switch and the second switch. In this case, the downlink packet may include DN-TM, T-TM1, T-TM2, and T-TM3. The base station 120 may insert T-TM4 into the GTP-U header of the received downlink packet. Thereafter, the base station 120 may perform a telemetry merge function (TMF). The TMF may be a function of merging the DN-TM and T-TMs. For example, the base station 120 may copy the DN-TM and T-TMs of the GTP-U header to the TCP/UDP header, and may remove the GTP-U header. The above-described TTF and TMF may be integrated into a telemetry information translator (TIT).

The base station 120 may determine a data network packet delay (DN PD) based on the DN-TM. In addition, the base station 120 may determine a core network packet delay (CN PD) based on the T-TMs. The base station 120 may identify a packet delay budget (PDB) based on the 5G quality of service identifier (5QI). Here, the PDB may be defined as the upper limit of a packet delay between the terminal 110 and the UPF 130. In another embodiment, the PDB may be defined as the upper limit of a packet delay between the terminal 110 and the data network. The base station 120 may determine an access network packet delay budget (AN PDB) based on the PDB, the DN PD, and the CN PD. For example, the AN PDB may be calculated according to Equation 3 below.

$$AN\ PDB = PDB - DN\ PD - CN\ PD \qquad \text{Equation 3}$$

The base station 120 may schedule a downlink packet based on the determined AN PDB. The base station 120 may transmit a downlink packet to the terminal 110 based on the determined AN PDB.

Figure 5:
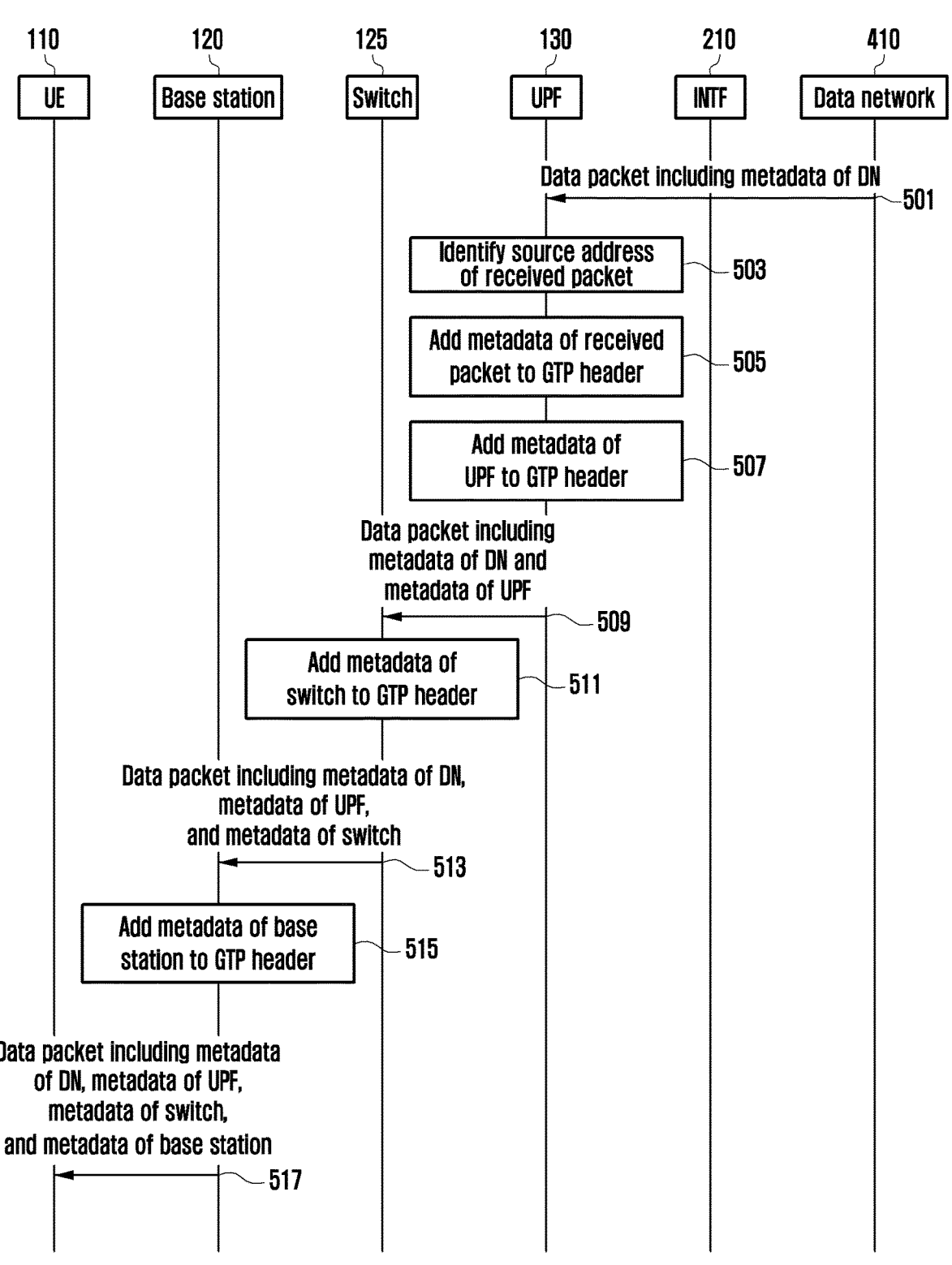
FIG. 5 illustrates a signal flow based on INT in a communication system according to an embodiment of the disclosure.

FIG. 5 illustrates a signal flow based on in-band network telemetry (INT) in a communication system according to an embodiment of the disclosure. FIG. 5 exemplifies a terminal 110, a base station 120, a switch 125, a UPF 130, an in-band network telemetry function (INTF), and a data network 410, as parts of nodes of an INT-based communication system.

Referring to FIG. 5, when the data network 410 is a trusted data network (trusted DN), a signal flow based on INT will be described.

Referring to FIG. 5, in operation 501, the UPF 130 may receive a downlink packet from a data network 410. In operation 503, the UPF 130 may identify a source Internet protocol (IP) address of the received downlink packet. The UPF 130 may identify whether the data network 410 is a trusted data network or an untrusted data network (untrusted DN) based on the identified IP address. In operation 505, if the identified data network 410 is a trusted data network, the UPF 130 may perform a telemetry translation function (TTF). That is, the UPF 130 may copy DN-TM included in a transmission control protocol/user datagram protocol (TCP/UDP) header and add the copied DN-TM to a GTP-U header. On the other hand, if the identified data network 410 is an untrusted DN, operation 505 may not be performed. That is, if the operation 505 is not performed, the TTF is not performed, and thus the DN TM may not be identified by the UPF 130, the switch 125, or the base station 120. In operation 507, the UPF 130 may add T-TM1, which is metadata of the UPF 130, to a GTP-U header of a downlink packet. In operation 509, the UPF 130 may transmit the downlink packet including the DN-TM and T-TM1 to the base station 120. In this case, the downlink packet may be transferred to the base station 120 via the switch.

In operation 511, the switch 125 may add T-TM2, which is metadata of the switch 125, to the GTP-U header of the downlink packet. The switch 125 may transmit the downlink packet to the base station 120 in operation 513.

In operation 515, the base station 120 may add T-TM3, which is metadata of the base station 120, to the GTP-U header of the downlink packet. After adding the T-TM3, the base station 120 may perform a telemetry merge function (TMF). That is, the base station 120 may add the T-TMs and DN TM included in the GTP-U header to the TCP/UDP header. The base station 120 may perform scheduling based on the GTP-U header. For example, when the data network 410 is a trusted data network, the GTP-U header may include DN TM and T-TMs (T-TM1, T-TM2, and T-TM3). In this case, the base station 120 may determine the AN PDB according to Equation 3 described with reference to FIG. 4. As another example, when the data network 410 is an untrusted DN, the GTP-U header may include T-TMs (T-TM1, T-TM2, and T-TM3). In this case, the base station 120 may determine the AN PDB according to Equation 2 described with reference to FIG. 3. The base station 120 may perform downlink scheduling for the terminal 110 based on the determined AN PDB, and may transmit the downlink packet to the terminal 110 in operation 517. In this case, the TCP/UDP header of the downlink packet may include DN-TM and T-TMs (T-TM1, T-TM2, and T-TM3).

Figure 6:
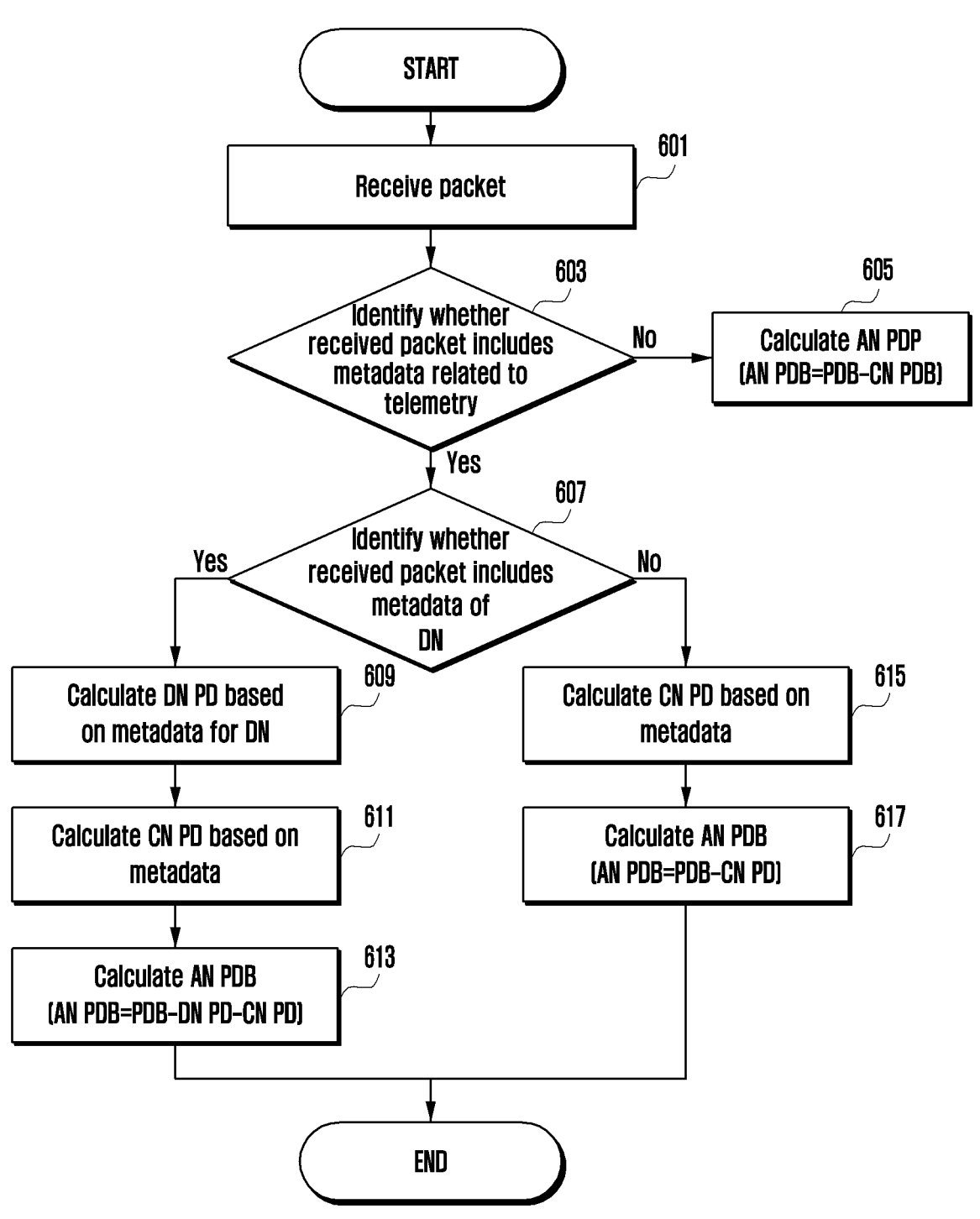
FIG. 6 illustrates an operation of a base station according to an embodiment of the disclosure.

FIG. 6 illustrates an operation of a base station according to an embodiment of the disclosure.

Referring to FIG. 6, in operation 601, the base station may receive a packet from a UPF. In this case, the packet may be received from the UPF through entities (e.g., a software defined network (SDN) switch) of a transport network (TN).

In operation 603, the base station may identify whether the received packet includes telemetry-related metadata. Telemetry-related metadata may be included in a GPRS tunneling protocol-user plane (GTP-U) header of the received packet. Accordingly, the base station may identify whether the received packet includes telemetry-related metadata based on the GTP-U header of the packet. If the received packet includes telemetry-related metadata, the base station may perform operation 607. On the other hand, if the received packet does not include telemetry-related metadata, the base station may perform operation 605. In this case, the base station may identify a packet data budget (PDB) and a CN PDB based on a 5G QoS identifier (5QI) of a QoS flow of the received packet. The base station may determine the AN PDB based on the PDB and the CN PDB.

In operation 607, the base station may identify whether the received packet includes metadata of the DN. In this case, the metadata of DN may be referred to as data network-telemetry metadata (DN-TM). When the received packet includes the metadata of the DN, the base station may perform operation 609. On the other hand, when the received packet does not include the metadata of the DN, the base station may perform operation 615.

In operation 609, the base station may calculate a data network packet delay (DN PD) based on the metadata for the DN. In operation 611, the base station may calculate a core network packet delay (CN PD) based on the metadata. Here, the metadata is metadata which is inserted into packets by transport network (TN) entities, and may be referred to as telecommunication company-telemetry metadata (T-TM). In operation 613, the base station may calculate the AN PDB based on the PDB, DN PD, and CN PD.

In operation 615, the base station may calculate a CN PD based on the metadata. Thereafter, in operation 617, the base station may calculate the AN PDB based on the PDB and the CN PD. The calculated AN PDB may be used to perform scheduling for the terminal by the base station.

Figure 7:
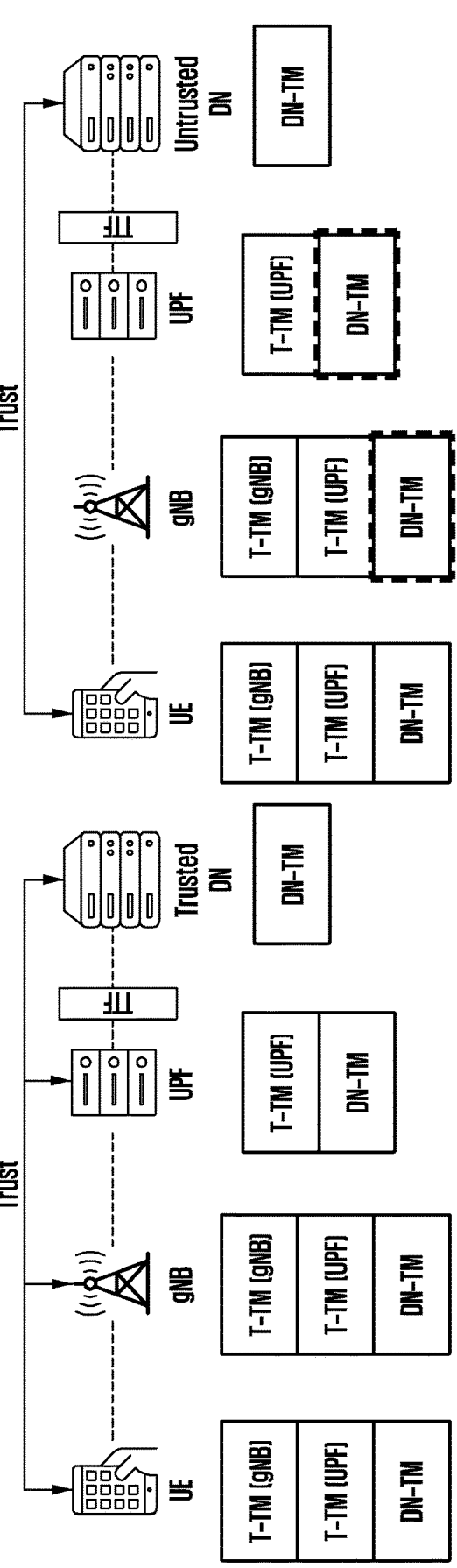
FIG. 7 illustrates a communication system based on INT according to an embodiment of the disclosure.

FIG. 7 illustrates a communication system based on in-band network telemetry (INT) according to an embodiment of the disclosure.

Referring to FIG. 7, a case in which a data network is a trusted data network (trusted DN) and a case in which a data network is an untrusted data network (untrusted DN) are separately described.

If a data network is an untrusted DN, a problem may occur due to no synchronization between entities of a transport network (TN) and the data network. Accordingly, the UPF may first identify whether the corresponding data network is a trusted data network based on a packet received from the data network. In this case, an Internet protocol (IP) header of the received packet may include a source IP address. The base station may determine whether the data network is a trusted data network based on the source IP address.

If a data network is a trusted data network, the UPF may copy metadata of a data network included in a transmission control protocol/user datagram protocol (TCP/UDP) header of a packet and add the copied metadata to the GTP-U header. That is, the UPF may perform a telemetry translation function (TTF). Accordingly, when the base station receives the corresponding packet later, the metadata of the data network may be used to calculate an access network packet delay budget (AN PDB). That is, a data network packet delay (DN PD) may also be reflected at the time of calculation of the AN PDB.

On the other hand, when a data network is an untrusted DN, the UPF does not perform the TTF. Therefore, the metadata of the data network is not included in the GTP-U header of a packet, and thus the base station may not reflect the DN PD at the time of calculation of the AN PDB. However, the TCP/UDP header may be transferred to the terminal by including metadata of the data network, so as to be used for identification of the end-to-end (E2E) delay.

Figure 8:
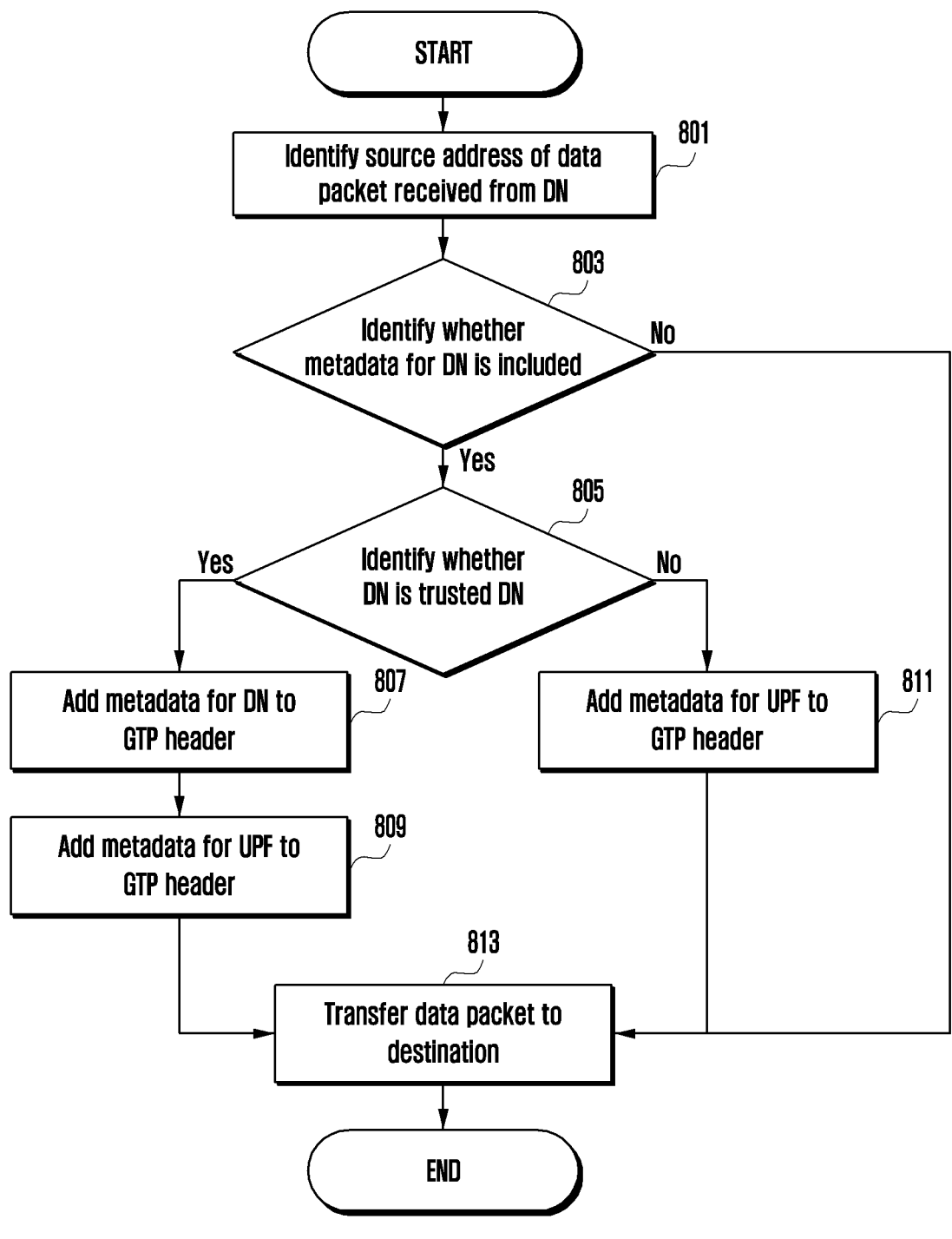
FIG. 8 illustrates an operation of a user plane function (UPF) according to an embodiment of the disclosure.

FIG. 8 illustrates an operation of a UPF according to an embodiment of the disclosure.

Referring to FIG. 8, in operation 801, the UPF may receive a data packet from a data network (DN). An Internet protocol (IP) header of the data packet may include information regarding a source IP address of the corresponding data packet. Therefore, the UPF may identify the source IP address of the data packet based on the IP header of the data packet.

In operation 803, the UPF may identify whether the data packet includes metadata for a DN. Here, the metadata for the DN may be referred to as data network-telemetry metadata (DN-TM). In this case, the UPF may identify whether a transmission control protocol/user datagram protocol (TCP/UDP) header of the data packet includes metadata for the DN. When the TCP/UDP header of the data packet includes metadata for the DN, the UPF may perform operation 805. On the other hand, when the TCP/UDP header of the data packet does not include metadata for the DN, the UPF may add metadata for the UPF to a GPRS tunneling protocol-user plane (GTP-U) header of the data packet and then, in operation 813, transfer the data packet to a destination.

In operation 805, the UPF may identify whether the data network is a trusted data network (trusted DN). In this case, the UPF may identify whether the data network is a trusted DN based on the source IP address identified in operation 801. When the data network is a trusted DN, the UPF may perform operation 807. On the other hand, when the data network is an untrusted DN, the UPF may perform operation 811.

In operation 807, the UPF may add the metadata for DN to the GTP-U header. In this case, the UPF may copy the metadata for DN included in the TCP/UDP header of the data packet and add the copied metadata for DN to the GTP-U header. That is, the UPF may perform a telemetry translation function (TTF).

In operation 809, the UPF may add metadata for UPF to the GTP-U header. Accordingly, the GTP-U header may include the metadata for DN and the metadata for UPF.

In operation 811, when the data network is an untrusted DN, the UPF may only add the metadata for UPF to the GTP header. That is, the UPF may not perform the TTF.

In operation 813, the UPF may transfer the data packet to the destination. In this case, the destination of the data packet may be identified based on the destination IP address included in the IP header of the data packet.

Figure 9:
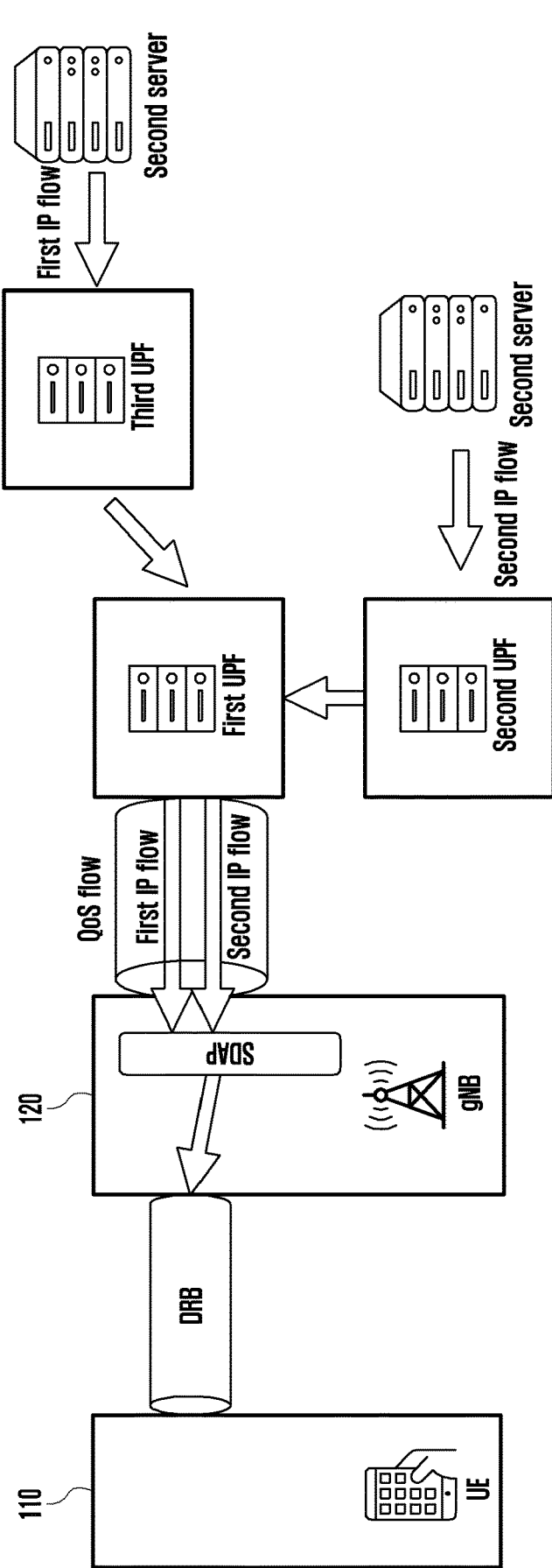
FIG. 9 illustrates a communication system based on INT according to an embodiment of the disclosure.

FIG. 9 illustrates a communication system based on in-band network telemetry (INT) according to an embodiment of the disclosure.

Referring to FIG. 9, a case in which packets corresponding to a specific IP flow are dropped when quality of service (QoS) is not satisfied for a predetermined period of time will be described. Referring to FIG. 9, it is assumed that two Internet protocol (IP) flows are mapped to the same QoS flow and data radio bearer (DRB).

The base station 120 may release a DRB corresponding to the QoS flow when QoS requirement(s) is not satisfied for a predetermined period of time. However, such a release of the DRB makes all IP flows to be dropped, and thus a service cannot be continued. Accordingly, when the QoS requirement(s) is not satisfied for a predetermined period of time, a method in which the base station 120 may selectively drop a specific IP flow rather than the DRB may be considered. In this case, as measures for identifying the specific IP flow, a core network packet delay (CN PD) and a data network packet delay (DN PD) may be used. For example, the base station 120 may identify at least one of a first CN PD and a first DN PD of first packets based on metadata included in a GPRS tunneling protocol-user plane (GTP-U) header of the first packets corresponding to a first IP flow. In addition, the base station 120 may identify at least one of a second CN PD and a second DN PD of second packets based on metadata included in the GTP-U header of the second packets corresponding to a second IP flow. Thereafter, the base station 120 may identify a first period of time for which the first packets are delayed in a data network and/or a transport network (TN), based on at least one of the first CN PD and the first DN PD. In addition, the base station 120 may identify a second period of time for which the second packets are delayed in the data network and/or the TN, based on at least one of the second CN PD and the second DN PD. The base station 120 may drop one of the first packets corresponding to the first IP flow and the second packets corresponding to the second IP flow based on the first period of time and the second period of time. For example, when the first period of time is 27 ms and the second period of time is 13 ms, the base station 120 may drop the first packets which are more delayed. Accordingly, since the second packets may be continuously transferred to the terminal, a service corresponding to some IP flows may be continued.

Figure 10:
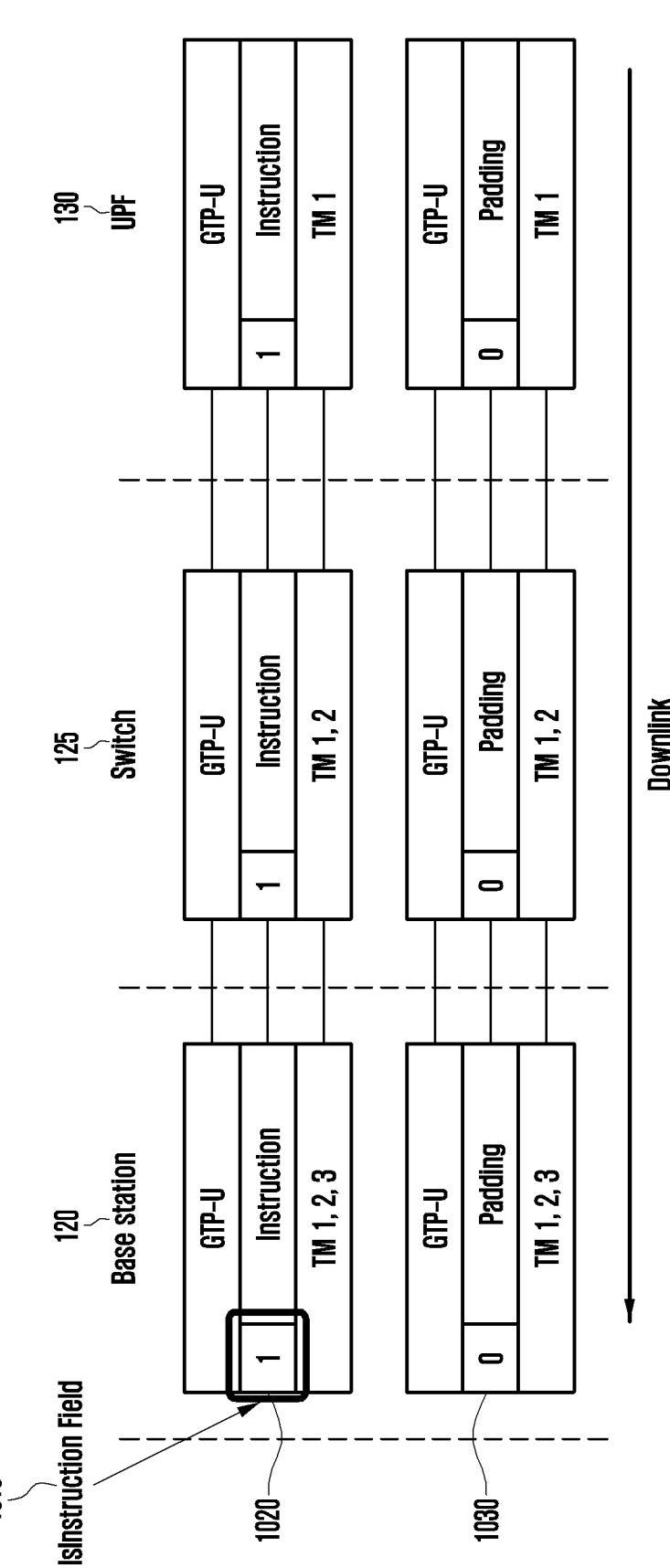
FIG. 10 illustrates a packet structure based on INT according to an embodiment of the disclosure.

FIG. 10 illustrates a structure of a data packet based on in-band network telemetry (INT) according to an embodiment of the disclosure.

Referring to FIG. 10, a method of high-speed processing of a packet through 1-bit information will be described.

Referring to FIG. 10, a GPRS tunneling protocol-user plane (GTP-U) header may include an instruction field indicating information that needs to be included in metadata. That is, the instruction field may indicate the type of information that needs to be inserted into the GTP-U header by entities of a transport network (TN). For example, the instruction field may indicate that the information that needs to be inserted into the GTP-U header by the entities of the TN is a timestamp. As another example, the instruction field may indicate that the information that needs to be inserted into the GTP-U header by the entities of the TN is buffer-related information (e.g., queue usage and queue congestion status). However, these are only examples, and the instruction field is information required for monitoring the network state and is not limited to the above-described examples.

As described above, the GTP-U header may include the instruction field. However, if the entities of the TN interpret the instruction field in all cases, the speed of processing the packet may decrease. Accordingly, the GTP-U header may include 1-bit of information before the instruction field. This 1-bit information may be referred to as an IsInstruction field 1010. The 1-bit information may indicate whether information that needs to be inserted into the GTP-U header by the entities of the TN has been changed. For example, when 1-bit of information is 1 (indicated by reference numeral 1020), the entities of the TN may interpret the instruction field to identify information that needs to be inserted into the GTP-U header. As another example, when 1-bit information is 0 (indicated by reference numeral 1030), the entities of the TN may not interpret the instruction field. That is, such a case may indicate that information that needs to be inserted into the GTP-U header has not been changed, the instruction field may be padded with 0. Accordingly, by allowing the entities of the TN to interpret the instruction field only when information that needs to be inserted into the GTP-U header has been changed, high-speed processing of packets may be possible.

Figure 11:
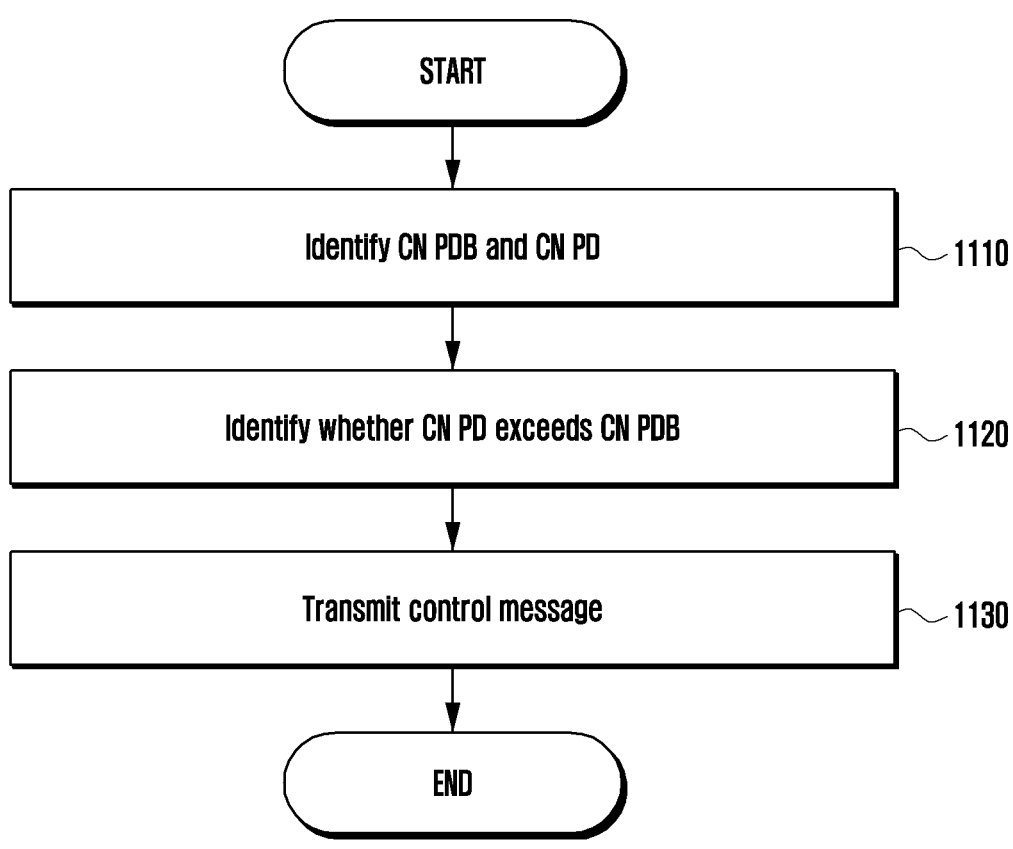
FIG. 11 illustrates an operation of a base station according to an embodiment of the disclosure.

FIG. 11 illustrates an operation of a base station according to an embodiment of the disclosure.

Referring to FIG. 11, telemetry frequency adjustment according to a core network packet delay (CN PD) of a quality of service (QoS) flow will be described.

Referring to FIG. 11, in operation 1110, the base station may identify a core network packet delay budget (CN PDB) and a CN PD. Here, the CN PDB may be defined as an upper limit of a packet delay time between the base station and a UPF, and the CN PD may be defined as an actual packet delay time between the base station and the UPF. The base station may identify the CN PDB based on a 5G QoS identifier (5QI) of a QoS flow for a received packet. The base station may identify the CN PD based on metadata included in a header of the received packet (e.g., a GPRS tunneling protocol-user plane (GTP-U) header). Here, the metadata may include telecommunication company-telemetry metadata (T-TM) inserted into a packet while the packet is being transmitted in a transport network (TN).

In operation 1120, the base station may identify whether the CN PD exceeds the CN PDB. A case in which the CN PD exceeds the CN PDB may be understood as meaning that delay is occurring in the TN from the viewpoint of QoS. For example, when queue congestion occurs due to a surge in QoS flows, the CN PD may exceed the CN PDB. On the other hand, a case in which the CN PD is equal to or less than the CN PDB may be understood as meaning that no delay is generated in the TN from the viewpoint of QoS.

In operation 1130, the base station may transmit a control message to a network device for performing a control plane network function. Here, the control plane network function corresponds to an in-band network telemetry function (INTF), and the control message may be referred to as a telemetry rate control message. The control messages may be periodically transmitted to the control plane network function. In this case, a periodicity in which the control message is transmitted may be configured by a control plane network function (e.g., INTF). A case in which the CN PD exceeds the CN PDB may be understood as the occurrence of queue congestion, and thus the control message may include information for requesting an increase in the telemetry frequency. That is, by increasing the metadata insertion frequency, the queue congestion state may be monitored in real time. On the other hand, a case in which the CN PD is equal to or less than the CN PDB may be understood as meaning that there is no problem in the delay of the TN, and thus the control message may include information for requesting a decrease in the telemetry frequency. That is, the network load may be reduced by decreasing the metadata insertion frequency.

Figure 12:
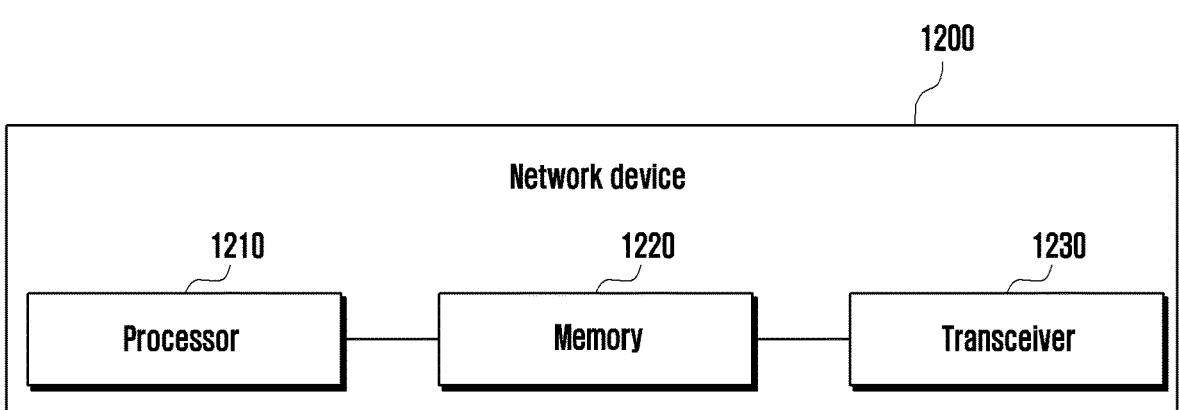
FIG. 12 illustrates a network device according to an embodiment of the disclosure.

FIG. 12 illustrates a network device (or a network entity) according to an embodiment of the disclosure.

Referring to FIG. 12, the network device 1200 may include a processor 1210, a memory 1220, and a transceiver 1230. Here, the network device 1200 may correspond to an in-band network telemetry function (INTF). Alternatively, the network device 1200 may correspond to a UPF. Alternatively, the INTF and UPF may be implemented together in the network device 1200.

The processor 1210 may control the overall operation of the network device 1200. For example, the processor 1210 may control the transceiver 1230 to transmit or receive a signal. In addition, the processor 1210 may perform functions of a protocol stack required by a communication standard. To this end, the processor 1210 may include at least one processor. In addition, the processor 1210 may control the network device 1200 to perform the above-described INTF function.

The memory 1220 may store data, such as a basic program, an application program, and configuration information for the operation of the network device 1200. The memory 1220 may be configured as a volatile memory, a non-volatile memory, or a combination of a volatile memory and a non-volatile memory. The memory 1220 may provide stored data according to a request of the processor 1210.

The transceiver 1230 may perform functions for transmitting or receiving signals through a wired channel. For example, the transceiver 1230 may perform a function of transmitting or receiving the signals with other network devices 1200 or a base station.

Figure 13:
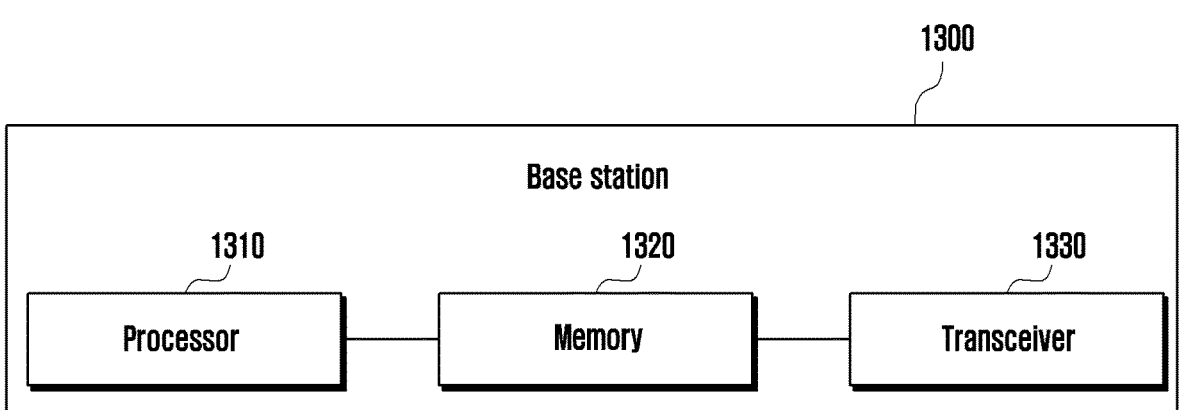
FIG. 13 illustrates a base station according to an embodiment of the disclosure.

FIG. 13 illustrates a base station according to an embodiment of the disclosure.

Referring to FIG. 13, the base station 1300 may include a processor 1310, a memory 1320, and a transceiver 1330.

The processor 1310 may control the overall operation of the base station 1300. For example, the processor 1310 may control the transceiver 1330 to transmit or receive a signal. In addition, the processor 1310 may perform functions of a protocol stack required by a communication standard. To this end, the processor 1310 may include at least one processor. In addition, the processor 1310 may control the base station 1300 to perform operations according to the above-described embodiments.

The memory 1320 may store data, such as a basic program, an application program, and configuration information for the operation of the base station 1300. The memory 1320 may be configured as a volatile memory, a non-volatile memory, or a combination of a volatile memory and a non-volatile memory. The memory 1320 may provide stored data according to a request of the processor 1310.

The transceiver 1330 may perform functions for transmitting or receiving signals through a wired channel or a wireless channel. For example, the transceiver 1330 may perform a function of converting between a baseband signal and a bit stream according to a physical layer standard of a system. For example, when transmitting data, the transceiver 1330 may generate complex symbols by encoding and modulating a transmission bit stream. Further, when receiving data, the transceiver 1330 may restore a received bit stream through demodulation and decoding of a baseband signal. In addition, the transceiver 1330 may up-convert a baseband signal into a radio frequency (RF) band signal, and then may transmit the signal via an antenna, and may down-convert an RF band signal received via an antenna into a baseband signal. To this end, the transceiver 1330 may include a transmission filter, a reception filter, an amplifier, a mixer, an oscillator, a digital to analog converter (DAC), an analog to digital converter (ADC), etc. In addition, the transceiver 1330 may include an antenna unit. The transceiver 1330 may include at least one antenna array including multiple antenna elements. In the hardware aspect, the transceiver 1330 may be configured by a digital and analog circuit (e.g., radio frequency integrated circuit (RFIC)). Here, the digital and analog circuit may be implemented in one package. In addition, the transceiver 1330 may include multiple RF chains. In addition, the transceiver 1330 may transmit or receive a signal. To this end, the transceiver 1330 may include at least one transceiver.

Figure 14:
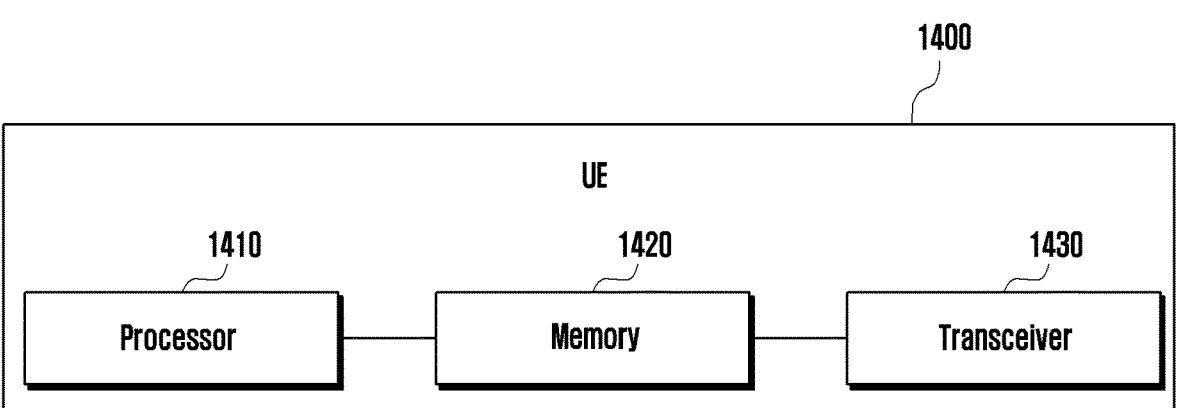
FIG. 14 illustrates a terminal according to an embodiment of the disclosure.

FIG. 14 illustrates a terminal according to an embodiment of the disclosure.

Referring to FIG. 14, the terminal 1400 may include a processor 1410, a memory 1420, and a transceiver 1430.

The processor 1410 may control the overall operation of the terminal 1400. For example, the processor 1410 may control the transceiver 1430 to transmit or receive a signal. In addition, the processor 1410 may perform functions of a protocol stack required by a communication standard. To this end, the processor 1410 may include at least one processor. In addition, the processor 1410 may control the terminal 1400 to perform operations according to the above-described embodiments.

The memory 1420 may store data, such as a basic program, an application program, and configuration information for the operation of the terminal 1400. The memory

1420 may be configured as a volatile memory, a non-volatile memory, or a combination of a volatile memory and a non-volatile memory. The memory 1420 may provide stored data according to a request of the processor 1410.

The transceiver 1430 may perform functions for transmitting or receiving signals through a wireless channel. For example, the transceiver 1430 may perform a function of converting between a baseband signal and a bit stream according to a physical layer standard of a system. For example, when transmitting data, the transceiver 1430 may generate complex symbols by encoding and modulating a transmission bit stream. Further, when receiving data, the transceiver 1430 may restore a received bit stream through demodulation and decoding of a baseband signal. In addition, the transceiver 1430 may up-convert a baseband signal into a radio frequency (RF) band signal, and then may transmit the signal via an antenna, and may down-convert an RF band signal received via an antenna into a baseband signal. To this end, the transceiver 1430 may include a transmission filter, a reception filter, an amplifier, a mixer, an oscillator, a digital to analog converter (DAC), an analog to digital converter (ADC), etc. In addition, the transceiver 1430 may include an antenna unit. The transceiver 1430 may include at least one antenna array including multiple antenna elements. In the hardware aspect, the transceiver 1430 may be configured by a digital and analog circuit (e.g., radio frequency integrated circuit (RFIC)). Here, the digital and analog circuit may be implemented in one package. In addition, the transceiver 1430 may include multiple RF chains. In addition, the transceiver 1430 may transmit or receive a signal. To this end, the transceiver 1430 may include at least one transceiver.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a communication system, the method comprising:

receiving a packet including packet delay metadata from a user plane function (UPF);

identifying a packet delay budget (PDB) for a quality of service (QOS) flow of the packet;

identifying a delay time of the packet based on the packet delay metadata;

determining an access network (AN) PDB based on the PDB and the delay time; and performing scheduling for transmission of the packet to a terminal based on the AN PDB, wherein a header of the packet includes an instruction field and a one-bit field indicating whether a type of the packet delay metadata to be inserted into the header of the packet has been changed, wherein in case that the one-bit field is set to 1, the instruction field indicates the type of the packet delay metadata to be inserted into the header of the packet, and wherein in case that the one-bit field is set to 0, the instruction field is padded with zeros.

2. The method of claim 1, further comprising:

identifying whether the packet delay metadata includes information related to a data network packet delay (DN PD), wherein the packet delay metadata includes information related to a core network packet delay (CN PD), wherein, in case that the packet delay metadata includes the information related to the DN PD, the delay time is determined based on the PDB, the DN PD, and the CN PD, and wherein, in case that the packet delay metadata does not include the information related to the DN PD, the delay time is determined based on the PDB and the CN PD.

3. The method of claim 2, further comprising:

identifying a CN PD budget (PDB) corresponding to the PDB;

identifying whether the CN PD exceeds the CN PDB; and transmitting a telemetry rate control message to a network device performing a control plane network function, wherein, in case that the CN PD exceeds the CN PDB, information for requesting an increase in a telemetry frequency is included in the telemetry rate control message, and wherein, in case that the CN PD is equal to or less than the CN PDB, information for requesting a decrease in the telemetry frequency is included in the telemetry rate control message.

4. The method of claim 1, wherein the header of the packet is a transmission control protocol/user datagram protocol (TCP/UDP) header.

5. The method of claim 2, wherein, in case that the packet delay metadata includes the information related to the DN PD, the PDB corresponds to an end-to-end PDB, and wherein, in case that the packet delay metadata does not include the information related to the DN PD, the PDB corresponds to an upper limit of a delay time between the terminal and the UPF.

6. A base station in a communication system, the base station comprising:

a transceiver; and at least one processor coupled with the transceiver and configured to:

receive a packet including packet delay metadata from a user plane function (UPF), identify a packet delay budget (PDB) for a quality of service (QOS) flow of the packet, identify a delay time of the packet based on the packet delay metadata, determine an access network (AN) PDB based on the PDB and the delay time, and perform scheduling for transmission of the packet to a terminal based on the AN PDB wherein a header of the packet includes an instruction field and a one-bit field indicating whether a type of the packet delay metadata to be inserted into the header of the packet has been changed, wherein in case that the one-bit field is set to 1, the instruction field indicates the type of the packet delay metadata to be inserted into the header of the packet, and wherein in case that the one-bit field is set to 0, the instruction field is padded with zeros.

7. The base station of claim 6, wherein the processor is further configured to identify whether the packet delay metadata includes information related to a data network packet delay (DN PD), wherein the packet delay metadata includes information related to a core network packet delay (CN PD), wherein, in case that the packet delay metadata includes the information related to the DN PD, the delay time is determined based on the PDB, the DN PD, and the CN PD, and wherein, in case that the packet delay metadata does not include the information related to the DN PD, the delay time is determined based on the PDB and the CN PD.

8. The base station of claim 7, wherein the processor is further configured to:

identify a CN PD budget (PDB) corresponding to the PDB, identify whether the CN PD exceeds the CN PDB, and transmit a telemetry rate control message to a network device performing a control plane network function, wherein, in case that the CN PD exceeds the CN PDB, information for requesting an increase in a telemetry frequency is included in the telemetry rate control message, and wherein, in case that the CN PD is equal to or less than the CN PDB, information for requesting a decrease in the telemetry frequency is included in the telemetry rate control message.

9. The base station of claim 6, wherein the header of the packet is a transmission control protocol/user datagram protocol (TCP/UDP) header.

10. The base station of claim 7, wherein, in case that the packet delay metadata includes the information related to the DN PD, the PDB corresponds to an end-to-end PDB, and wherein, in case that the packet delay metadata does not include the information related to the DN PD, the PDB corresponds to an upper limit of a delay time between the terminal and the UPF.

\* \* \* \* \*